United States Patent
Kadota et al.

(10) Patent No.: US 11,105,242 B2
(45) Date of Patent: Aug. 31, 2021

(54) EXHAUST GAS PURIFICATION DEVICE

(71) Applicant: DENSO CORPORATION, Kariya (JP)

(72) Inventors: Yoichi Kadota, Kariya (JP); Yasushi Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/864,423

(22) Filed: May 1, 2020

(65) Prior Publication Data

US 2020/0256235 A1 Aug. 13, 2020

Related U.S. Application Data

(63) Continuation of application No. PCT/JP2018/039407, filed on Oct. 24, 2018.

(30) Foreign Application Priority Data

Nov. 3, 2017 (JP) .............................. JP2017-213339

(51) Int. Cl.
*F01N 3/021* (2006.01)
*F01N 3/28* (2006.01)

(52) U.S. Cl.
CPC ........... *F01N 3/2803* (2013.01); *F01N 3/021* (2013.01); *F01N 2330/02* (2013.01); *F01N 2370/02* (2013.01)

(58) Field of Classification Search
CPC ............ B01D 53/944; B01D 2255/407; B01D 2255/908; B01D 2255/102; B01D 53/9454; B01J 37/0248; B01J 35/0006; B01J 23/40; B01J 21/066; B01J 23/63; B01J 21/04; B01J 35/04; B01J 35/10; F01N 2510/06; F01N 2250/02; F01N 13/009; F01N 13/0097; F01N 3/2828; F01N 3/0222; F01N 3/2803; F01N 3/021; F01N 2330/02; F01N 2370/02
See application file for complete search history.

(56) References Cited

U.S. PATENT DOCUMENTS

| | | | | |
|---|---|---|---|---|
| 2011/0252773 | A1* | 10/2011 | Arnold | B01J 23/63 60/297 |
| 2014/0301926 | A1* | 10/2014 | Hatfield | B01D 53/944 423/213.5 |
| 2015/0176455 | A1* | 6/2015 | Chandler | B01J 20/18 60/286 |

(Continued)

FOREIGN PATENT DOCUMENTS

| | | |
|---|---|---|
| EP | 2 380 649 | 10/2011 |
| JP | 2015-085241 | 5/2015 |
| JP | 2015166051 A * | 9/2015 |

*Primary Examiner* — Matthew T Largi
(74) *Attorney, Agent, or Firm* — Nixon & Vanderhye P.C.

(57) ABSTRACT

The exhaust gas purification device of the present embodiment is provided in an exhaust gas flow path of an internal combustion engine. The exhaust gas purification device includes a honeycomb catalyst and a PM trapping filter. The honeycomb catalyst is formed by supporting a catalyst on a first substrate which is made of a promoter and has a honeycomb structure. The PM trapping filter is located on the exhaust gas downstream side of the honeycomb catalyst and includes a second substrate having a honeycomb structure, configured to be capable of trapping PM.

9 Claims, 5 Drawing Sheets

(56) References Cited

U.S. PATENT DOCUMENTS

| | | | | |
|---|---|---|---|---|
| 2016/0038927 A1* | 2/2016 | Kadota | ............... | B01J 37/0018 |
| | | | | 502/304 |
| 2016/0201534 A1* | 7/2016 | Lambert | ............... | F01N 3/0253 |
| | | | | 60/274 |
| 2018/0229183 A1* | 8/2018 | Kadota | ............... | B01J 37/0248 |
| 2019/0331013 A1* | 10/2019 | Sung | ................... | B01J 35/0006 |

* cited by examiner

▲ TEST EXAMPLE 1 ~ 5
✕ TEST EXAMPLE 6 ~ 10
● TEST EXAMPLE 11 ~ 15
■ COMPARISON EXAMPLE 1 ~ 5

EXHAUST GAS PURIFICATION DEVICE

CROSS-REFERENCE TO RELATED APPLICATION

The present application is a continuation application of International Application No. PCT/JP2018/039407 filed on Oct. 24, 2018, which claims priority to Japanese Patent Application No. 2017-213339 filed on Nov. 3, 2017. The contents of these applications are incorporated herein by reference in their entirety.

BACKGROUND

Technical Field

The present disclosure relates to an exhaust gas purification device

Background Art

A catalyst filter that purifies exhaust gas by a catalytic reaction, and a PM (Particulate Matter) filter that traps particulate matter, are provided in the exhaust gas flow path of an internal combustion engine as an exhaust gas purification device. By disposing the catalyst filter and the PM filter in tandem, the PM filter can be provided at a position close to the internal combustion engine, thereby enabling natural regeneration to occur, in which PM deposited on the PM filter is burned off by exhaust heat of the internal combustion engine.

SUMMARY

According to one aspect, the present disclosure provides an exhaust gas purification device, comprising:
a honeycomb catalyst comprising a first substrate, formed of a promoter and has a honeycomb structure, with a catalyst supported thereon; and,
a PM trapping filter located on the exhaust gas downstream side of the honeycomb catalyst and comprising a second substrate, having a honeycomb structure.

BRIEF DESCRIPTION OF THE DRAWINGS

The above objectives and other objectives, features and advantages of the present disclosure are made clearer from the detailed description given hereafter, referring to the appended drawings. In the drawings.

DETAILED DESCRIPTION OF THE PREFERRED EMBODIMENTS

Figure 1:
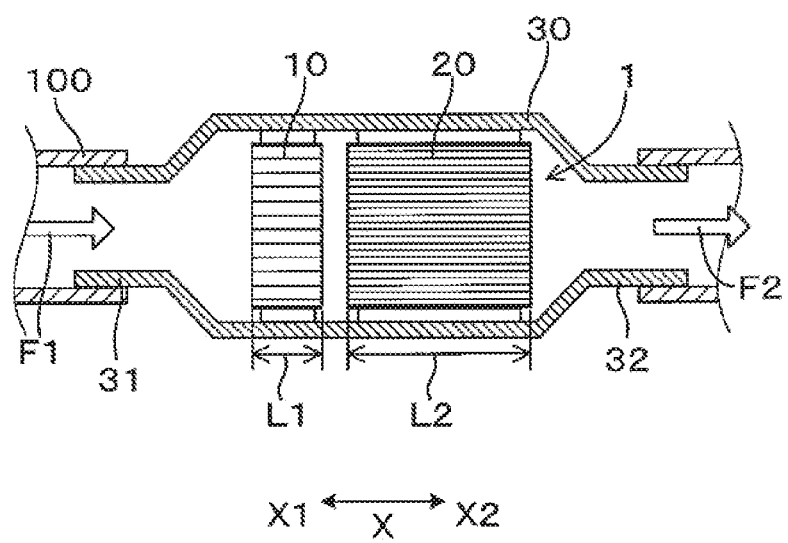
FIG. 1 is a conceptual cross-sectional view illustrating a configuration of an exhaust gas purification device according to a first embodiment.

A catalyst filter that purifies exhaust gas by a catalytic reaction, and a PM (Particulate Matter) filter that traps particulate matter, are provided in the exhaust gas flow path of an internal combustion engine as an exhaust gas purification device. By disposing the catalyst filter and the PM filter in tandem, the PM filter can be provided at a position close to the internal combustion engine, thereby enabling natural regeneration to occur, in which PM deposited on the PM filter is burned off by exhaust heat of the internal combustion engine.

For example, JP 5584487 B discloses an exhaust gas purification device in which a honeycomb catalyst having a three-way catalyst supported on a first honeycomb substrate, and a plugged honeycomb structure in which part of an opening surface of a second honeycomb substrate is plugged, are disposed in a tandem arrangement. The exhaust gas purification device captures PM contained in exhaust gas, using the plugged honeycomb structure.

When the A/F (air-fuel ratio) in the interior of the three-way catalyst departs from the stoichiometric A/F, the purification rate of NOx deteriorates, that is, the NOx emission worsens. In view of this, attempts have been made to maintain a stoichiometric A/F by performing feedback control using an A/F sensor. In addition, an oxygen storage material that stores and releases oxygen has been coated on the honeycomb catalyst, as a promoter, to maintain the stoichiometric A/F inside the catalyst.

With the above configuration, when the A/F fluctuates greatly, such as during acceleration of the internal combustion engine, it becomes difficult to maintain the stoichiometric A/F inside the three-way catalyst, and the NOx emission deteriorates, so that the exhaust gas purification action becomes degraded. To solve this, it is necessary to increase the amount of coating with the promoter, in order to store oxygen which may be excess or deficient. However, when the amount of the promoter coating is increased, the heat capacity of the honeycomb catalyst increases, and thus the warm-up performance deteriorates. As a result, NOx emission is worsened, in particular when starting the internal combustion engine. On the other hand if the length of the honeycomb catalyst is increased, to increase the amount of promoter coating, the plugged honeycomb structure becomes shortened due to the limitations of the mounting space, and hence the PM trapping rate is reduced, while also the pressure loss is increased, thereby leading to a decrease in the output of the internal combustion engine. There is thus scope for improving the PM trapping rate, improving the purification action, and suppressing an increase in pressure loss.

The present disclosure is intended to provide an exhaust gas purification device capable of providing an improved PM trapping rate, suppressing an increase in pressure loss, and improving the exhaust gas purification action.

According to one aspect, the present disclosure provides an exhaust gas purification device, to be provided in the exhaust gas flow path of an internal combustion engine, comprising:

a honeycomb catalyst comprising a first substrate, formed of a promoter and has a honeycomb structure, with a catalyst supported thereon; and, a PM trapping filter, configured to be capable of trapping PM, located on the exhaust gas downstream side of the honeycomb catalyst and comprising a second substrate, having a honeycomb structure.

In the exhaust gas purification device, the first substrate, which constitutes the honeycomb catalyst, is composed of a promoter. It is thus made possible to reduce or eliminate the need to coat a promoter on the first substrate, while maintaining a high oxygen storage amount (OSC amount). This makes it possible to reduce the heat capacity of the honeycomb catalyst and improve the warm-up performance while maintaining the exhaust gas purifying action. As a result, it is possible to improve the exhaust gas purifying action, in particular when starting the internal combustion engine. Furthermore, since the exhaust gas purification device is a tandem type, in which a PM trapping filter is provided downstream from the honeycomb catalyst, the PM trapping filter can readily be regenerated by the exhaust heat of the internal combustion engine, and PM trapping can be effectively performed. It thus becomes possible to improve the convergence rate and to suppress an increase in pressure loss.

As described above, according to the present disclosure, an exhaust gas purification device can be provided that is capable of improving the PM trapping rate, suppressing a rise in pressure loss, and improving the exhaust gas purification action.

First Embodiment

An embodiment of the exhaust gas purification device will be described referring to FIGS. 1 to 9.

As shown in FIG. 1, the exhaust gas purification device 1 of the present embodiment is provided in an exhaust gas flow path 100 of an internal combustion engine, and includes a honeycomb catalyst 10 and a PM trapping filter 20.

Figure 2:
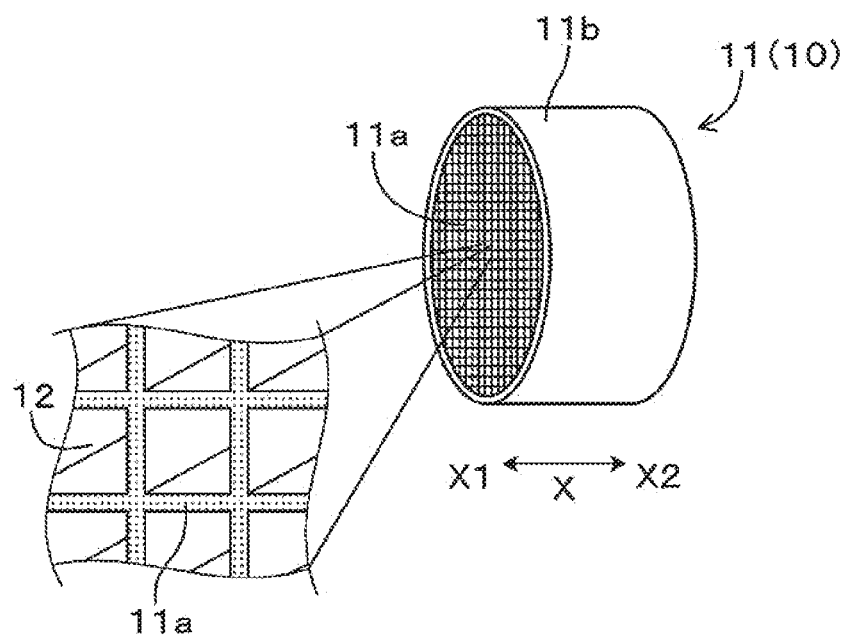
FIG. 2 is a conceptual diagram showing a configuration of a honeycomb catalyst according to the first embodiment.

As shown in FIG. 2, the honeycomb catalyst 10 is formed by supporting a catalyst on a first substrate 11, which has a honeycomb structure and is formed of a promoter.

As shown in FIG. 1, the PM trapping filter 20 is located on the exhaust gas downstream side X2 with respect to the honeycomb catalyst 10, and is configured with a second substrate 21 having a honeycomb structure, to enable the trapping of PM.

The exhaust gas purification device 1 of the present embodiment will be described in detail in the following, referring to FIGS. 1 to 3. As shown in FIG. 1, the exhaust gas purification device 1 has a metal casing 30. The honeycomb catalyst 10 and the PM trapping filter 20 are retained within the casing 30. The first end 31 of the casing 30 is open, and is connected to the upstream side X1 of the exhaust gas flow path 100. The second end 32 of the casing 30 is open, and is connected to the lower side X2 of the exhaust gas flow path 100. Thus, the exhaust gas F1 flows into the exhaust gas purification device 1, is purified, and is discharged as exhaust gas F2.

The first substrate 11, constituting the honeycomb catalyst 10 shown in FIG. 2, is formed of a promoter. The first substrate 11 may be composed, for example, of raw material particles containing a promoter as a main component, and a material containing an inorganic binder for binding the raw material particles. Alumina particles, ceria-zirconia composite oxide, etc., may be employed as the promoter. The first substrate 11 has a honeycomb structure, as shown in FIG. 2.

The honeycomb structure is a structure having a porous partition wall 11a that defines a plurality of cells 12, which serve as flow paths for exhaust gas, etc., and an outer peripheral wall 11b that is located at the outermost periphery of the partition wall.

The porosity of the first substrate 11 can be varied by changing the mixing ratio of the promoter and the inorganic binder. For example, the porosity of the first substrate 11 can be 20% or more, and is preferably 50% or more.

A catalyst (not shown) is supported on the first substrate 11. In the present embodiment, a three-way catalyst including Pt, Pd, and Rh is employed as the catalyst. The first substrate 11 may be coated with a promoter together with the catalyst.

Figure 3:
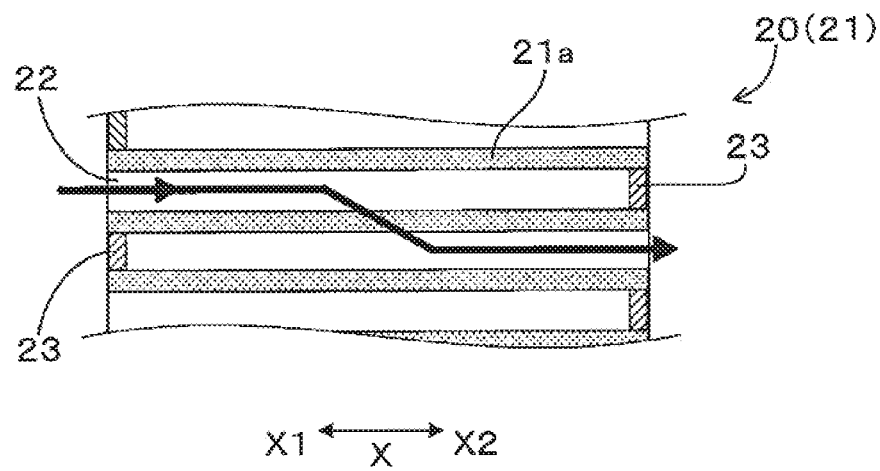
FIG. 3 is a conceptual diagram showing a configuration of a PM trapping filter in the first embodiment.

As shown in FIG. 3, the second substrate 21 constituting the PM trapping filter 20 has a honeycomb structure. There is no particular limitation on the material used to form the second substrate 21, and this may be ceramic or the like. The second substrate 21 has porous partition walls 21a that define a plurality of cells 22. Plug portions 23 for plug the ends of the cells 22 are provided on both end surfaces of the second substrate 21. The plugging portions 23 are provided at either one end of each cell 22, and are provided at opposite ends of adjacent cells 22.

(Evaluation Test 1)

Next, the following Evaluation Test 1 was performed. In the Evaluation Test 1, the PM trapping rate, the pressure loss, the NOx emission, and the oxygen storage amount (OSC amount) of Comparison Examples 1 to 5, described hereinafter, were calculated. To calculate the PM trapping rate, a 2.0-liter gasoline supercharged direct-injection vehicle was equipped with an exhaust gas purification device at the rear stage of the turbocharger, and was driven in the WLTC mode, which is an operation mode in accordance with European regulations, in a chassis dynamometer test, and the PM trapping rate was obtained by measuring the particle number concentration (PN) of total discharged particles.

The NOx emission was calculated by measuring the amount of nitrogen oxide emission in a 2.0 L gasoline direct injection vehicle while being driven in the WLTC mode.

To calculate the pressure loss, the exhaust gas purification device was first subjected to a durability test for accelerated ash deposition, in a bench test of an engine, and 40 g of ash was deposited in the exhaust gas purification device. After the ash deposition, the exhaust gas purification device was installed in the exhaust system of the 2.0 L gasoline supercharged direct injection vehicle, and the pressure loss of the engine was measured when operated under a condition of an intake air rate of 100 g/s.

To calculate the OSC amount, firstly a perturbation of $\pm 2.0\phi\%$ at 1 Hz was applied in a bench test of a 2.5 L engine to vary the target A/F, and the point at which the emission of NOx/CO became a minimum was calculated as the catalyst stoichiometric A/F. Here, $\phi$ is an equivalent ratio, obtained by dividing the stoichiometric air-fuel ratio by the actual air-fuel ratio. Thereafter, the A/F step width was set to $\pm 5\phi\%$ from the calculated catalyst stoichiometry, a lean gas flow and a rich gas flow were alternately passed through the catalyst, with a cycle holding time of 60 seconds, and the oxygen concentrations before and after passing through the catalyst were measured. The average oxygen storage amount, in three cycles in which the target A/F was changed from the rich side to the lean side, was then calculated as the OSC amount.

Figure 4A:
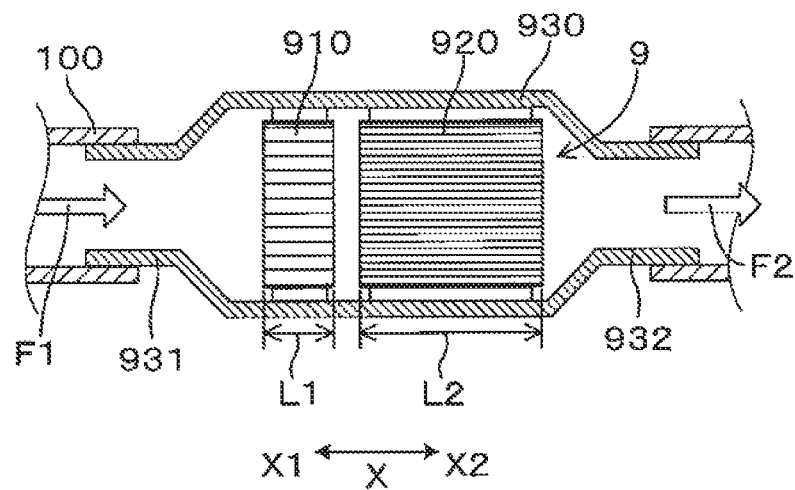
FIG. 4A is a conceptual cross-sectional view of an exhaust gas purification device in a conventional configuration and FIG. 4B is a conceptual cross-sectional view of a catalytic filter in a conventional configuration.
Figure 4B:
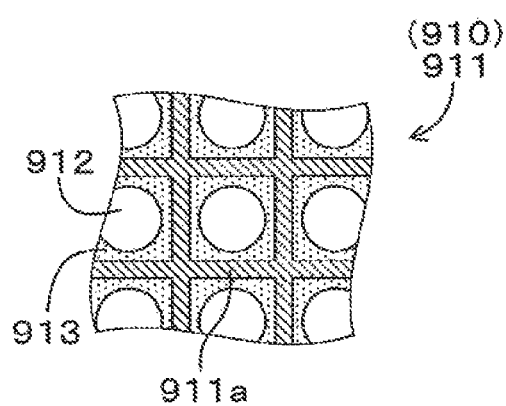

An exhaust gas purification device 9 having the conventional configuration shown in FIG. 4A was utilized for Comparison Examples 1 to 5. As shown in FIG. 4A, in the exhaust gas purification device 9, a Fr catalyst 910 is provided on the Fr side X1, which is at the upstream side in the casing 930, and a PM filter 920 is provided on the Rr side X2, which is downstream from the Fr catalyst 910. The upstream opening 931 of the casing 930 is connected to the upstream side X1 of the exhaust gas flow path 100, and the downstream opening 932 is connected to the downstream side of the exhaust gas flow path 100. As shown in FIG. 4B, the Fr catalyst 910 has a honeycomb structure 911 made of ceramic, with a wall surface of a partition wall 911a thereof coated with a promoter 913. Although not shown, a coating of a three-way catalyst is also formed. The cells 912 of the Fr catalyst 910 are thus smaller than the cells 12 of the exhaust gas purification device 1 of the first embodiment shown in FIG. 2. The PM filter 920 in the exhaust gas purification device 9 has the same configuration as that of the first embodiment, and is coated with a three-way catalyst and a promoter. Table 1 shows the configurations of the substrates on the Fr and Rr sides and the amounts of coating of the catalyst, etc., in the exhaust gas purification devices 9 of Comparison Examples 1 to 5, and Table 8 shows the test results.

In the table, "Fr substrate" indicates the substrate of the Fr catalyst 910. In the column of Fr substrate, "ternary coating amount" is the amount of the promoter coated on the Fr catalyst 910, "PGM amount" is the amount of platinum group element, and "Fr coating amount" is the amount of the promoter in the Fr catalyst 910. When the Fr substrate is composed of a promoter, the "ternary coat amount" indicates the weight of the Fr substrate itself.

In addition, in the table, "Rr substrate" and the substrate of the PM filter 920 are shown. In the column of Rr substrate, the "ternary coating amount" is the amount of promoter that is coated on the PM filter 920, and the "PGM amount" is the amount of platinum group element.

"Fr substrate+Rr substrate" in the table indicates the totals of the Fr catalyst 910 and the PM filter 920. In the column "Fr substrate+Rr substrate", "Fr coating amount" indicates the total of the amount of the promoter contained in the first substrate 11 of the Fr catalyst 910 and the amount of promoter coating, when the promoter is further coated on the substrate. The "Rr coating amount" is the amount of promoter in the PM filter 920. The "Fr+Rr coating amount" is the total amount of the promoter in the Fr catalyst 910 and the PM filter 920.

TABLE 1

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Comparison Example 1 | 118 | 70 | 600 | 3 | 0.77 | 450 | 2.0 | 450 | — |
| Comparison Example 2 | | | | | | 350 | | 350 | |
| Comparison Example 3 | | | | | | 250 | | 250 | |
| Comparison Example 4 | | | | | | 150 | | 150 | |
| Comparison Example 5 | | | | | | 50 | | 50 | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Comparison Example 1 | 118 | 70 | 300 | 8 | 0.77 | 50 | 1.0 |
| Comparison Example 2 | | | | | | | |
| Comparison Example 3 | | | | | | | |
| Comparison Example 4 | | | | | | | |
| Comparison Example 5 | | | | | | | |

| | Fr Substrate + Rr Substrate | | | |
|---|---|---|---|---|
| | Length (mm) | Fr coating amount (g/each) | Rr coating amount (g/each) | Fr + Rr coating amount (g/each) |
| Comparison Example 1 | 140 | 344 | 38 | 382 |
| Comparison Example 2 | | 268 | | 306 |
| Comparison Example 3 | | 191 | | 229 |
| Comparison Example 4 | | 115 | | 153 |
| Comparison Example 5 | | 38 | | 76 |

Figure 5:
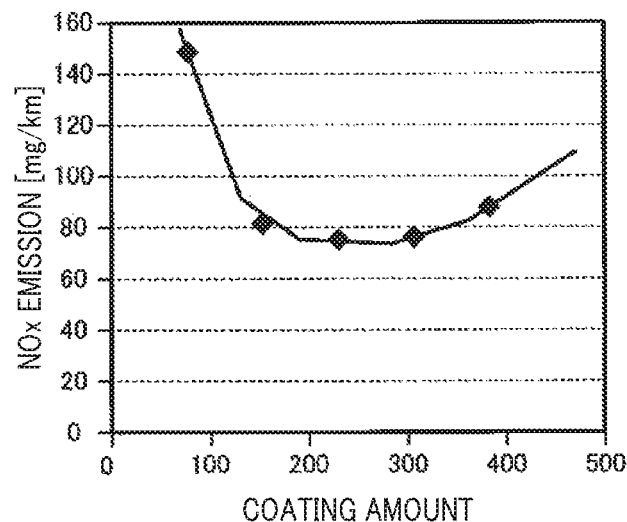
FIG. 5 is a diagram showing results of a confirmation test 1.

As shown in Table 1, in Comparison Examples 1 to 5, the amount of Fr coating was changed, while the configurations on the Rr side were kept identical to one another and the amount of Rr coating was not changed. FIG. 5 shows the relationship between the coating amount and NOx emission in Comparison Examples 1 to 5. As shown in FIG. 5 and Table 8, in Comparison Examples 1 to 5, Comparison Example 3 has the lowest NOx emission. In Comparison Examples 4 and 5 in which the Fr coating amount is smaller than for Comparison Example 3, the OSC amount is insufficient, and the NOx emission is increased. On the other hand, in Comparison Examples 1 and 2, in which the Fr coating amount is greater than in Comparison Example 3, the OSC amount is sufficient, but the heat capacity of the Fr catalyst 910 is increased and the warm-up performance deteriorated, thereby causing the NOx emission to be increased.

Furthermore, as shown in Table 8, the pressure loss was relatively large in each of the Comparison Examples 1 to 5.

(Evaluation Test 2)

Next, the following Evaluation Test 2 was performed. In the Evaluation Test 2, a test similar to the Evaluation Test 1 was performed, using as the exhaust gas purification device of Comparison Examples 6 to 10 an exhaust gas purification device 9 having the conventional configuration with the coating amount of the comparison example 3 as shown in Table 2, and with the lengths L1 and L2 of the substrates on the Fr and Rr sides being varied while maintaining the total length L1+L2 of the substrates unchanged. Table 2 below shows the configurations etc., of the substrates on the Fr and Rr sides in the exhaust gas purification device 9 of Comparison Examples 6 to 10, while the test results are shown in Table 8 below.

8, the amount of the OSC is increased because the amount of the coated promoter increases together with the increase of the Fr-side substrate. However, the PM trapping ability is reduced due to the decrease in the volume of the substrate on the Rr side. Furthermore, as shown in Table 8, the pressure loss was relatively large in Comparison Examples 6 to 10, (Evaluation Test 3)

Next, the following Evaluation Test 3 was performed. In the Evaluation Test 3 as shown in Table 3, as the Test Examples 1 to 5, the same test as for the Evaluation Test 1 was performed, using an exhaust gas purification device 1 as the exhaust gas purification device 1 according to the first embodiment in which the length L1 of the first substrate 11 on the Fr side and the length L2 of the second substrate 21 on the Rr side were varied while maintaining the total length L1+L2 of the substrates unchanged. Table 3 shows the

TABLE 2

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Comparison Example 6 | 118 | 20 | 600 | 3 | 0.22 | 250 | 2.0 | 250 | — |
| Comparison Example 7 | | 40 | | | 0.44 | | | | |
| Comparison Example 8 | | 70 | | | 0.77 | | | | |
| Comparison Example 9 | | 100 | | | 1.09 | | | | |
| Comparison Example 10 | | 120 | | | 1.31 | | | | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Comparison Example 6 | 118 | 120 | 300 | 8 | 1.31 | 50 | 1.0 |
| Comparison Example 7 | | 100 | | | 1.09 | | |
| Comparison Example 8 | | 70 | | | 0.77 | | |
| Comparison Example 9 | | 40 | | | 0.44 | | |
| Comparison Example 10 | | 20 | | | 0.22 | | |

| | Fr Substrate + Rr Substrate | | | |
|---|---|---|---|---|
| | Length (mm) | Fr coating amount (g/each) | Rr coating amount (g/each) | Fr + Rr coating amount (g/each) |
| Comparison Example 6 | 140 | 55 | 66 | 120 |
| Comparison Example 7 | | 109 | 55 | 164 |
| Comparison Example 8 | | 191 | 38 | 230 |
| Comparison Example 9 | | 273 | 22 | 295 |
| Comparison Example 10 | | 328 | 11 | 339 |

As shown in Table 8, the NOx emission is the lowest in Comparison Example 8, in which the lengths L1 and L2 of the substrate on the Fr side and on the Rr side are respectively equal.

Figure 6:
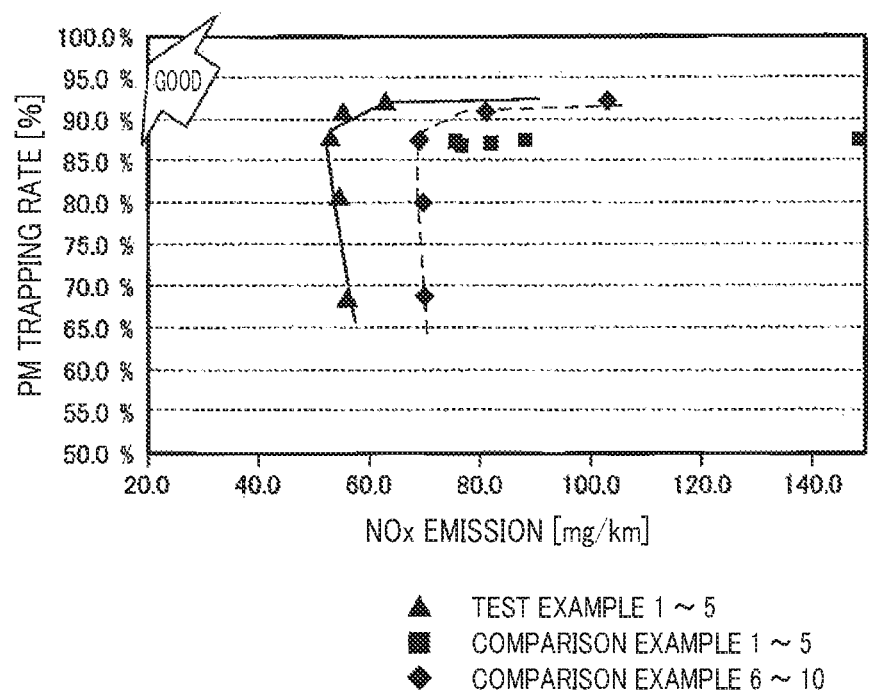
FIG. 6 is a diagram showing results of a confirmation test 3.

Furthermore, in Comparison Examples 9 and 10, in which the Fr-side substrate is longer than in Comparison Example configurations of the substrates on the Fr and Rr sides in the exhaust gas purification devices 1 of Test Examples 1 to 5, and Table 8 shows the test results. FIG. 6 shows the relationship between the NOx emission and the PM trapping rate in Test Examples 1 to 5 and Comparison Examples 1 to 10 described above.

TABLE 3

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Test Example 1 | 118 | 70 | 600 | 3 | 0.77 | 315 | 2.0 | 315 | 50 |
| Test Example 2 | | 40 | | | 0.44 | | | | |

TABLE 3-continued

| | | |
|---|---|---|
| Test Example 3 | 20 | 0.22 |
| Test Example 4 | 100 | 1.09 |
| Test Example 5 | 120 | 1.31 |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Test Example 1 | 118 | 70 | 300 | 8 | 0.77 | 50 | 1.0 |
| Test Example 2 | | 100 | | | 1.09 | | |
| Test Example 3 | | 120 | | | 1.31 | | |
| Test Example 4 | | 40 | | | 0.44 | | |
| Test Example 5 | | 20 | | | 0.22 | | |

| | Fr Substrate + Rr Substrate | | | |
|---|---|---|---|---|
| | Length (mm) | Fr coating amount (g/each) | Rr coating amount (g/each) | Fr + Rr coating amount (g/each) | Ceria zirconia solid solution ratio (wt %) |
| Test Example 1 | 140 | 241 | 38 | 279 | 30 |
| Test Example 2 | | 138 | 55 | 192 | |
| Test Example 3 | | 69 | 66 | 135 | |
| Test Example 4 | | 344 | 22 | 366 | |
| Test Example 5 | | 413 | 11 | 424 | |

As shown in Table 8, in all of Test Examples 1 to 5, the pressure loss was significantly reduced by comparison with Comparison Examples 1 to 10. Furthermore, as shown in Table 8 and FIG. 6, in all of the Test Examples 1 to 5, the NOx emissions were lower than in the comparison examples 1 to 10. In particular the NOx emission was the lowest in the Test Example 1, while the PM trapping rate was sufficiently low. In FIG. 6, the results of Test Examples 1 to 5 as a whole are shifted toward the upper left of the graph, indicating a high PM trapping rate and low NOx emission, in relation to the comparison examples 1 to 10. It was shown that an improvement of both the PM trapping rate and prevention of deterioration of the exhaust gas purification action were achieved.

Figure 7:
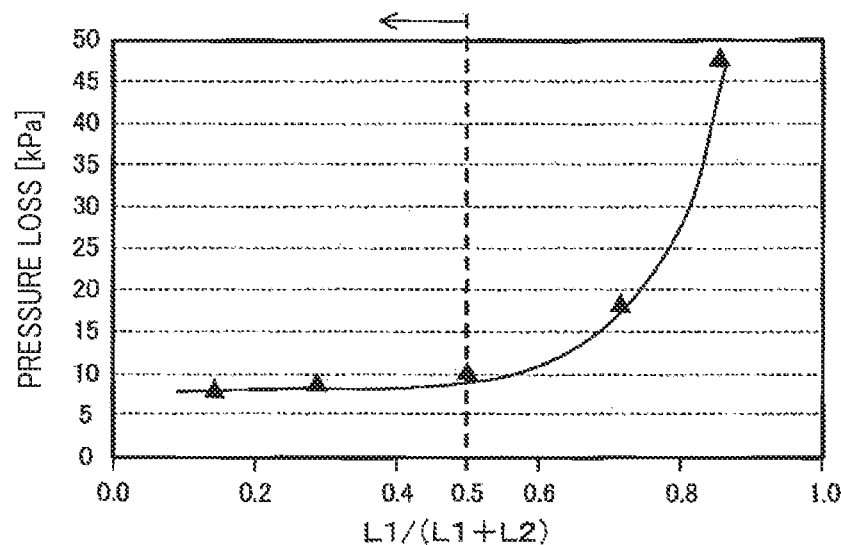
FIG. 7 is a diagram showing results of the confirmation test 3.

FIG. 7 shows, for Test Examples 1 to 5, the relationship between the pressure loss and the ratio of the length L1 of the first substrate 11 to the total length L1+L2 of the lengths L1 of the first substrate 11 and L2 of second substrate 21, that is, the relationship between L1/(L1+L2) and the pressure loss. As shown in FIG. 7, it was confirmed that when L1/(L1+L2) was 0.5 or less, the pressure loss was sufficiently low.

(Evaluation Test 4)

Next, the following Evaluation Test 4 was performed. In the Evaluation Test 4, a test similar to the Evaluation Test 1 was performed, for Test Examples 6 to 10 as shown in Table 4 below, using the exhaust gas purification device 1 of the first embodiment, with the porosity of the first substrate 11 on the Fr side set at 60%, and with the length L1 of the first substrate and the length L2 of the second substrate being varied while maintaining the total length L1+L2 of the first substrate 11 on the Fr side and the second substrate 21 on the Rr side unchanged. Table 4 shows the configurations of the substrates on the Fr and Rr sides in the exhaust gas purification device 1 of Test Examples 6 to 10, and Table 8 shows the test results.

TABLE 4

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Test Example 6 | 118 | 70 | 600 | 3 | 0.77 | 296 | 2.0 | 296 | 60 |
| Test Example 7 | | 40 | | | 0.44 | | | | |
| Test Example 8 | | 20 | | | 0.22 | | | | |
| Test Example 9 | | 100 | | | 1.09 | | | | |
| Test Example 10 | | 120 | | | 1.31 | | | | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Test Example 6 | 118 | 70 | 300 | 8 | 0.77 | 50 | 1.0 |
| Test Example 7 | | 100 | | | 1.09 | | |

TABLE 4-continued

| | | |
|---|---|---|
| Test Example 8 | 120 | 1.31 |
| Test Example 9 | 40 | 0.44 |
| Test Example 10 | 20 | 0.22 |

| | Fr Substrate + Rr Substrate | | | |
|---|---|---|---|---|
| | Length (mm) | Fr coating amount (g/each) | Rr coating amount (g/each) | Fr + Rr coating amount (g/each) | Ceria zirconia solid solution ratio (wt %) |
|---|---|---|---|---|---|
| Test Example 6 | 140 | 227 | 38 | 265 | 30 |
| Test Example 7 | | 129 | 55 | 184 | |
| Test Example 8 | | 65 | 66 | 130 | |
| Test Example 9 | | 324 | 22 | 346 | |
| Test Example 10 | | 388 | 11 | 399 | |

Furthermore as shown in Table 5 below, in the Evaluation Test 5, a test similar to the Evaluation Test 1 was performed, for Test Examples 11 to 15 as shown in Table 5 below, using the exhaust gas purification device 1 of the first embodiment described above, with the porosity of the first substrate 11 on the Fr side set at 40%, and with the length L1 of the first substrate and the length L2 of the second substrate being varied while maintaining the total length L1+L2 of the first substrate 11 on the Fr side and the second substrate 21 on the Rr side unchanged. Table 5 shows the configurations of the substrates on the Fr and Rr sides in the exhaust gas purification device 1 of Test Examples 11 to 15, and Table 8 shows the test results.

Figure 8:
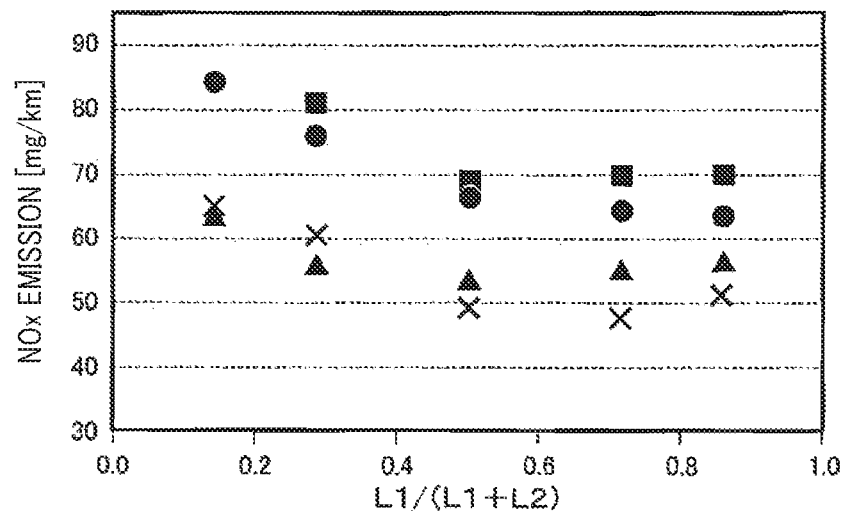
FIG. 8 is a diagram showing results of a confirmation test 4.

FIG. 8 shows the relationship between L1/(L1+L2) and NOx emission, for Test Examples 1 to 15 and Comparison Examples 1 to 5. As shown in FIG. 8 and Table 8, it was confirmed that the NOx emission became decreased in accordance with increase of the porosity of the first substrate 11. On the other hand, in Test Examples 12 and 13, the NOx emission became increased. The reason for this is that, when the porosity of the first substrate 11 is less than 50% and L1/(L1+L2) is less than 0.5, the rate of the diffusion of the gas deteriorates against a time during the gas passes through the first substrate 11 to the promoter, the oxygen absorption and release speed then becomes slow, and the oxygen storage function (OSC function) of the promoter deteriorates.

TABLE 5

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Test Example 11 | 118 | 70 | 600 | 3 | 0.77 | 341 | 2.0 | 341 | 40 |
| Test Example 12 | | 40 | | | 0.44 | | | | |
| Test Example 13 | | 20 | | | 0.22 | | | | |
| Test Example 14 | | 100 | | | 1.09 | | | | |
| Test Example 15 | | 120 | | | 1.31 | | | | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Test Example 11 | 118 | 70 | 300 | 8 | 0.77 | 50 | 1.0 |
| Test Example 12 | | 100 | | | 1.09 | | |
| Test Example 13 | | 120 | | | 1.31 | | |
| Test Example 14 | | 40 | | | 0.44 | | |
| Test Example 15 | | 20 | | | 0.22 | | |

| | Fr Substrate + Rr Substrate | | | | |
|---|---|---|---|---|---|
| | Length (mm) | Fr coating amount (g/each) | Rr coating amount (g/each) | Fr + Rr coating amount (g/each) | Ceria zirconia solid solution ratio (wt %) |
| Test Example 11 | 140 | 261 | 38 | 299 | 30 |
| Test Example 12 | | 149 | 55 | 204 | |
| Test Example 13 | | 75 | 66 | 140 | |
| Test Example 14 | | 373 | 22 | 395 | |
| Test Example 15 | | 447 | 11 | 458 | |

(Evaluation Test 5)

Next, the following Evaluation Test 5 was performed. In the Evaluation Test 5, as shown in Table 6 below, the same test as the Evaluation Test 1 was performed as Test Examples 16 to 19, using the exhaust gas purification device 1 of the first embodiment, with the porosity of the first substrate 11 on the Fr side set at 50% and L1/(L1+L2) set at 0.5, and with the ratio of the ceria-zirconia solid solution in the promoter being varied. Here, the "ratio of the ceria-zirconia solid solution" signifies the ratio of the weight of the ceria-zirconia solid solution to the total weight of the components contained in the promoter constituting the substrate. Table 6 shows the configurations of the substrates on the Fr and Rr sides in the exhaust gas purification device 1 of Test Examples 16 to 19, and Table 8 shows the test results. In Test Examples 1 to 15, as shown in Tables 3 to 5, the ratio of the ceria-zirconia solid solution was 30 wt %.

TABLE 6

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Test Example 16 | 118 | 70 | 600 | 3 | 0.77 | 385 | 2.0 | 385 | 50 |
| Test Example 17 | | | | | | 360 | | 360 | |
| Test Example 18 | | | | | | 271 | | 271 | |
| Test Example 19 | | | | | | 150 | | 150 | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Test Example 16 | 118 | 70 | 300 | 8 | 0.77 | 50 | 1.0 |
| Test Example 17 | | | | | | | |
| Test Example 18 | | | | | | | |
| Test Example 19 | | | | | | | |

| | Fr Substrate + Rr Substrate | | | | |
|---|---|---|---|---|---|
| | Length (mm) | Fr coating amount (g/each) | Rr coating amount (g/each) | Fr + Rr coating amount (g/each) | Ceria zirconia solid solution ratio (wt %) |
| Test Example 16 | 140 | 295 | 38 | 333 | 50 |
| Test Example 17 | | 276 | | 314 | 40 |
| Test Example 18 | | 207 | | 246 | 20 |
| Test Example 19 | | 115 | | 153 | 10 |

As shown in Table 8, the higher the ratio of the ceria-zirconia solid solution in the promoter, the greater becomes the amount of OSC. As the ratio of the ceria-zirconia solid solution decreases, the amount of OSC decreases accordingly, and hence the NOx emission deteriorates. It was confirmed that when the ratio of the ceria-zirconia solid solution in the promoter is 40% or more, an improved exhaust gas purification action can be obtained.

(Evaluation Test 6)

Next, the following Evaluation Test 6 was performed. In the Evaluation Test 6, shown in Table 7 below as Reference Examples 1 to 5, a test similar to Test 1 was performed using the exhaust gas purification device 9 having the above-described conventional configuration, with the amounts of coating of the catalyst and the promoter on the substrate 911 on the Rr side being varied. Table 7 shows the configurations of the substrates on the Fr and Rr sides in the exhaust gas purification device of Reference Examples 1 to 5, and Table 8 shows the test results.

TABLE 7

| | Fr Substrate | | | | | | | | |
|---|---|---|---|---|---|---|---|---|---|
| | Diameter (mm) | Length (mm) | Cell density (cpsi) | Wall Thickness (mil) | Volume (L) | Ternary coating amount/ substrate weight (g/L) | PGM amount (g/cat) | Fr coating amount (g/L) | Porosity (%) |
| Reference Example 1 | 118 | 70 | 600 | 3 | 0.77 | 250 | 2.0 | 250 | — |
| Reference Example 2 | | | | | | | | | |
| Reference Example 3 | | | | | | | | | |
| Reference Example 4 | | | | | | | | | |
| Reference Example 5 | | | | | | | | | |

| | Rr Substrate | | | | | | |
|---|---|---|---|---|---|---|---|
| | Diameter (mm) | Length (mm) | Cell density (cpsi) | Wall Thickness (mil) | Volume (L) | Ternary coating amount (g/L) | PGM amount (g/cat) |
| Reference Example 1 | 118 | 70 | 300 | 8 | 0.77 | 0 | 1.0 |
| Reference Example 2 | | | | | | 20 | |
| Reference Example 3 | | | | | | 50 | |
| Reference Example 4 | | | | | | 100 | |
| Reference Example 5 | | | | | | 150 | |

| | Fr Substrate + Rr Substrate | | | |
|---|---|---|---|---|
| | Length (mm) | Fr coating amount (g/each) | Rr coating amount (g/each) | Fr + Rr coating amount (g/each) |
| Reference Example 1 | 140 | 191 | 0 | 191 |
| Reference Example 2 | | | 15 | 207 |
| Reference Example 3 | | | 38 | 230 |
| Reference Example 4 | | | 77 | 268 |
| Reference Example 5 | | | 115 | 306 |

Figure 9:
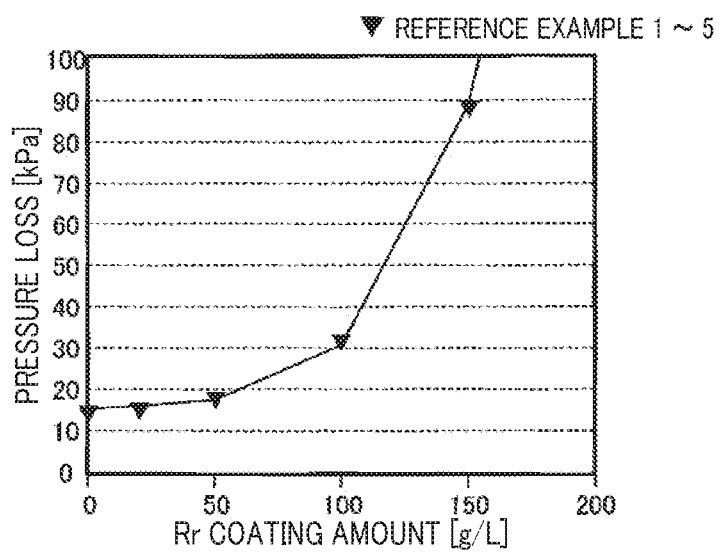
FIG. 9 is a diagram showing results of a confirmation test 6.

As shown in Table 8 and FIG. 9, it was confirmed that the pressure loss rapidly increased as the amount of coating of the catalyst on the Rr-side substrate was increased. This is because the pores of the substrate on the Rr side, that is, the cells, become closed. Hence it is preferable for the substrate on the Rr side not to be excessively coated with the catalyst. From the results of the Evaluation Test 6 shown in Table 8 and FIG. 9, it is preferable that the amount of the catalyst coating on the Rr side substrate is made 100 g/L or less. Since the change in pressure loss due to the coating amount of the catalyst on the substrate on the Rr side is not affected by the configuration of the catalyst filter on the Fr side, the amount of catalyst coating on the second substrate 21 is preferably made 100 g/L or less also in the exhaust gas purification device 1 of Test Examples 1 to 19.

Table 8 below shows the results of the above Evaluation Tests 1 to 6.

TABLE 8

| | | Trapping rate (%) | Pressure loss (kPa) | NOx emission (mg/km) | OSC amount (g) |
|---|---|---|---|---|---|
| Evaluation Test 1 | Comparison example 1 | 87.6 | 28.3 | 88.3 | 1.2 |
| | Comparison example 2 | 87.0 | 21.5 | 76.9 | 0.9 |
| | Comparison example 3 | 87.5 | 18.1 | 75.7 | 0.7 |
| | Comparison example 4 | 87.3 | 17.0 | 82.1 | 0.5 |
| | Comparison example 5 | 87.5 | 14.8 | 149.2 | 0.3 |
| Evaluation Test 2 | Comparison example 6 | 92.3 | 11.4 | 103.4 | 0.3 |
| | Comparison example 7 | 91.0 | 13.5 | 81.3 | 0.5 |
| | Comparison example 8 | 87.6 | 18.1 | 69.3 | 0.7 |
| | Comparison example 9 | 80.1 | 29.4 | 70.0 | 0.9 |
| | Comparison example 10 | 69.0 | 66.3 | 70.2 | 1.1 |
| Evaluation Test 3 | Test example 1 | 88.0 | 10.9 | 53.2 | 0.8 |
| | Test example 2 | 91.2 | 8.8 | 55.5 | 0.5 |
| | Test example 3 | 92.3 | 8.0 | 63.0 | 0.3 |
| | Test example 4 | 81.0 | 18.0 | 54.6 | 1.2 |
| | Test example 5 | 68.8 | 47.6 | 56.1 | 1.4 |
| Evaluation Test 4 | Test example 6 | 88.0 | 11.2 | 49.2 | 0.8 |
| | Test example 7 | 91.2 | 8.9 | 60.5 | 0.5 |
| | Test example 8 | 92.3 | 8.2 | 65.0 | 0.3 |
| | Test example 9 | 81.0 | 18.5 | 47.6 | 1.1 |
| | Test example 10 | 68.8 | 47.3 | 51.1 | 1.3 |
| | Test example 11 | 88.0 | 10.5 | 67.2 | 0.5 |
| | Test example 12 | 91.2 | 9.0 | 76.5 | 0.2 |
| | Test example 13 | 92.3 | 8.2 | 85.0 | 0.1 |
| | Test example 14 | 81.0 | 18.5 | 64.6 | 1.0 |
| | Test example 15 | 68.8 | 48.0 | 64.1 | 1.2 |
| Evaluation Test 5 | Test example 16 | 87.0 | 10.1 | 52.2 | 1.3 |
| | Test example 17 | 88.2 | 10.5 | 50.2 | 1.0 |
| | Test example 18 | 88.1 | 10.6 | 83.2 | 0.2 |
| | Test example 19 | 88.5 | 10.5 | 93.2 | 0.1 |
| Evaluation Test 6 | Reference example 1 | 88.2 | 14.6 | 90.5 | 0.6 |
| | Reference example 2 | 87.6 | 15.4 | 80.5 | 0.6 |

TABLE 8-continued

|  | Trapping rate (%) | Pressure loss (kPa) | NOx emission (mg/km) | OSC amount (g) |
|---|---|---|---|---|
| Reference example 3 | 87.5 | 18.1 | 76.0 | 0.7 |
| Reference example 4 | 87.6 | 32.2 | 72.1 | 0.8 |
| Reference example 5 | 88.0 | 88.2 | 65.1 | 0.9 |

Next, the operation and effects of the exhaust gas purification device 1 of the present embodiment will be described in detail.

With the exhaust gas purification device 1, the first substrate 11, which constitutes the honeycomb catalyst 10, is made of the promoter. Therefore, the amount of promoter that is coated on the first substrate 11 can be reduced, or that coating may be made unnecessary, while maintaining a high OSC amount. The heat capacity of the honeycomb catalyst 10 can thereby be reduced and the warm-up performance can thus be improved, while maintaining the exhaust gas purifying function, and furthermore the exhaust gas purifying action can be improved, in particular when starting the internal combustion engine.

Furthermore, since the exhaust gas purification device 1 is of a tandem type, in which the PM trapping filter 20 is provided downstream from the honeycomb catalyst 10, the PM trapping filter 20 can readily be regenerated by the exhaust heat of the internal combustion engine, and the PM trapping rate can thus be improved, and an increase in pressure loss can be prevented.

Moreover with the present embodiment, the length L1 of the first substrate 11 in the flow direction of the exhaust gases F1 and F2 in the exhaust gas flow path 100 is made less than half the total of the lengths L1 of the first substrate 11 and L2 of the second substrate 21, in the Test Examples 1 to 3, 6 to 8, 11 to 13, and 16 to 19. In that case, since the second substrate 21 on the Rr side can be made relatively long, a rise in pressure loss is prevented and the PM trapping rate is maintained.

With the present embodiment, the porosity of the first substrate 11 is set to 50% or more in the Test Examples 1 to 10 and 16 to 19 described above. The first substrate 11 is thereby prevented from becoming excessively dense, so that gas can readily diffuse into the promoter. As a result, the OSC function of the promoter can be exhibited sufficiently, and the exhaust gas purifying action is improved.

In addition, with the present embodiment, the OSC amount of the first substrate 11 is 0.2 g or more in Test Examples 1 to 12 and 14 to 18 described above. In that case, the amount of OSC necessary for reliably exhibiting the OSC function is secured, so that the exhaust gas purification action is improved.

With the present embodiment, in Test Examples 1 to 17, the weight ratio of the ceria-zirconia solid solution in the first substrate 11 is 30 wt % or more. The amount of OSC necessary for reliably exhibiting the OSC function is thereby secured, so that the exhaust gas purification action can be improved.

In addition, with the present embodiment, in the Test Examples 1 to 19 above, the second substrate 21 is coated with the promoter and the catalyst. In that case, the total amount of OSC becomes increased, and hence the exhaust gas purifying action can be improved.

Furthermore, with the present embodiment, as shown in the above reference examples, the total amount of the catalyst coated on the second substrate 21 is preferably 100 g/L or less. The pores in the wall of the second substrate 21 are thereby prevented from becoming excessively blocked by the catalyst, so that an increase in the pressure loss can be prevented.

With the present embodiment, in Test Examples 1 to 19 described above, the first substrate 11 is coated with a promoter. As a result, the amount of OSC in the first substrate 11 can readily be secured, so that the exhaust gas purifying action can be improved.

Although the present disclosure has been described based on embodiments it is understood that the present disclosure is not limited to the embodiments or the structure thereof. The present disclosure also encompasses various modifications and variations that come within the scope of equivalent. In addition, various combinations and forms, and other combinations and forms including only one element, more, or less, are also contained in the scope and spirit of the present disclosure.

What is claimed is:

1. An exhaust gas purification device provided in an exhaust gas flow path of an internal combustion engine, comprising:
    a honeycomb catalyst comprising a first substrate, formed of a promoter and having a first honeycomb structure, with a catalyst supported on the first substrate; and,
    a PM trapping filter, configured to be capable of trapping PM, located on an exhaust gas downstream side of the honeycomb catalyst and comprising a second substrate, having a second honeycomb structure, wherein
    a weight ratio of a ceria zirconia solid solution in the first substrate is 30 wt % or more,
    a length of the first substrate in a flow direction of an exhaust gas in the exhaust gas flow path is half of a total length of the length of the first substrate and a length of the second substrate or less, and
    a porosity of the first substrate is 50% or more.

2. The exhaust gas purification device according to claim 1, wherein the first substrate has an oxygen storage amount of 0.2 g or more.

3. The exhaust gas purification device according to claim 1, wherein the second substrate is coated with another promoter and a catalyst.

4. The exhaust gas purification device according to claim 3, wherein total coating amount of the catalyst on the second substrate is 100 g/L or less.

5. The exhaust gas purification device according to claim 1, wherein the first substrate is coated with another promoter.

6. An exhaust gas purification device provided in an exhaust gas flow path of an internal combustion engine, comprising:
    a honeycomb catalyst comprising a first substrate, formed of a promoter and having a first honeycomb structure, with a catalyst supported on the first substrate; and,
    a PM trapping filter, configured to be capable of trapping PM, located on an exhaust gas downstream side of the honeycomb catalyst and comprising a second substrate, having a second honeycomb structure, wherein
    a weight ratio of a ceria zirconia solid solution in the first substrate is 30 wt % or more,
    a length of the first substrate in a flow direction of an exhaust gas in the exhaust gas flow path is half of a total length of the length of the first substrate and a length of the second substrate or less, and the first substrate is coated with another promoter.

7. The exhaust gas purification device according to claim 6, wherein the first substrate has an oxygen storage amount of 0.2 g or more.

8. The exhaust gas purification device according to claim 6, wherein the second substrate is coated with another promoter and a catalyst.

9. The exhaust gas purification device according to claim 8, wherein total coating amount of the catalyst on the second substrate is 100 g/L or less.

* * * * *